US011920740B2

(12) United States Patent
Heffels et al.

(10) Patent No.: US 11,920,740 B2
(45) Date of Patent: Mar. 5, 2024

(54) CENTERING RING FOR AN LED RETROFIT FOR A VEHICLE LIGHT

(71) Applicant: LUMILEDS LLC, San Jose, CA (US)

(72) Inventors: Wilbert Heffels, Eindhoven (NL); Jean-Rene Cotel, Saint André de l'Eure (FR); Josef Andreas Schug, Würselen (DE)

(73) Assignee: LUMILEDS LLC, San Jose, CA (US)

( * ) Notice: Subject to any disclaimer, the term of this patent is extended or adjusted under 35 U.S.C. 154(b) by 0 days.

(21) Appl. No.: 17/710,322

(22) Filed: Mar. 31, 2022

(65) Prior Publication Data

US 2022/0316659 A1 Oct. 6, 2022

Related U.S. Application Data

(60) Provisional application No. 63/168,826, filed on Mar. 31, 2021.

(51) Int. Cl.

| | |
|---|---|
| ***F21S 41/19*** | (2018.01) |
| ***F21K 9/237*** | (2016.01) |
| ***F21S 41/148*** | (2018.01) |
| ***F21S 43/14*** | (2018.01) |
| *F21Y 115/10* | (2016.01) |

(52) U.S. Cl.

CPC ............ *F21K 9/237* (2016.08); *F21S 41/148* (2018.01); *F21S 41/192* (2018.01); *F21S 43/14* (2018.01); *F21Y 2115/10* (2016.08)

(58) Field of Classification Search

CPC .......... F21S 41/19; F21S 41/23; F21S 41/148; F21S 43/14; F21S 41/141; F21S 41/192; F21S 41/198; F21Y 2115/10; F21K 9/237; F21K 9/235; F21K 9/23; F21K 9/27; F21V 19/04

See application file for complete search history.

(56) References Cited

U.S. PATENT DOCUMENTS

| | | | | |
|---|---|---|---|---|
| 8,313,348 | B2 | 11/2012 | Mertens et al. | |
| 2006/0245198 | A1* | 11/2006 | Chen | F21S 41/194 362/459 |
| 2018/0299093 | A1* | 10/2018 | Lai | F21S 41/192 |

FOREIGN PATENT DOCUMENTS

| | | | | |
|---|---|---|---|---|
| CN | 201228895 | | 4/2009 | |
| CN | 202403139 | U * | 8/2012 | F21S 48/1109 |
| DE | 202020101383 | | 3/2020 | |
| EP | 3421882 | A1 | 1/2019 | |
| EP | 3839322 | A1 * | 6/2021 | F21K 9/23 |
| GB | 1589380 | A | 5/1981 | |

OTHER PUBLICATIONS

Search English translation of CN-202403139-U (Year: 2012).*

* cited by examiner

*Primary Examiner* — Omar Rojas Cadima
(74) *Attorney, Agent, or Firm* — Volpe Koenig

(57) ABSTRACT

A centering ring for an LED retrofit lamp is described. The lamp includes a ring-shaped body that includes an outer ring and an opening in a central region of the ring-shaped body that receives the LED retrofit lamp. The lamp also includes a recess formed in the outer rim of the ring-shaped body in at least two locations.

11 Claims, 8 Drawing Sheets

(a)

(b)

(c)

(a)

(b)

(c)

(a)

(b)

(c)

CENTERING RING FOR AN LED RETROFIT FOR A VEHICLE LIGHT

CROSS-REFERENCE TO RELATED APPLICATIONS

This application claims the benefit of U.S. Provisional Application No. 63/168,826, filed Mar. 31, 2021, the contents of which are incorporated herein by reference.

BACKGROUND

Light emitting diodes (LEDs) more and more replace older technology light sources, such as halogen, gas-discharge, and Xenon lamps, due to superior technical properties, such as, for example, energy efficiency and lifetime. Such older technology light sources may also be referred to as conventional lamps. This may also be true for demanding applications, for example in terms of luminance, luminosity, and/or beam shaping, such as, for example, vehicle headlighting. Considering the vast installation base of conventional lamps, providing so-called LED retrofit lamps, or LED retrofits for short, more or less one-to-one replacing conventional lamps while allowing continued use of the other system components, such as optics (reflectors, lenses, etc.) and luminaires, may be of great economic interest.

SUMMARY

A centering ring for an LED retrofit lamp is described. The lamp includes a ring-shaped body that includes an outer ring and an opening in a central region of the ring-shaped body that receives the LED retrofit lamp. The lamp also includes a recess formed in the outer rim of the ring-shaped body in at least two locations.

BRIEF DESCRIPTION OF THE DRAWINGS

A more detailed understanding can be had from the following description, given by way of example in conjunction with the accompanying drawings wherein.

DETAILED DESCRIPTION

For an LED retrofit providing a fully functional replacement of a conventional lamp, besides the general light technical requirements, many further constraints incurred by the continued use of the other system components have to be respected. Besides light technical data like luminance and angular light distribution, mechanical boundary conditions as to size and shape arise as the LED retrofit has to fit into the same installation space as the conventional lamp it replaces, and, in particular, the LED retrofit has to use the same fixation mechanism as the replaced conventional lamp. In that context, this disclosure addresses centering rings, sometimes also termed center, adapter, or, simply, mounting or fixation rings, and used for mounting a lamp within a corresponding lamp fixture of a vehicle light, in particular, of a vehicle front or rear light.

Examples of different light illumination systems and/or light emitting diode ("LED") implementations will be described more fully hereinafter with reference to the accompanying drawings. These examples are not mutually exclusive, and features found in one example may be combined with features found in one or more other examples to achieve additional implementations. Accordingly, it will be understood that the examples shown in the accompanying drawings are provided for illustrative purposes only and they are not intended to limit the disclosure in any way. Like numbers refer to like elements unless explicitly otherwise indicated.

It will be understood that, although the terms first, second, third, etc. may be used herein to describe various elements, these elements should not be limited by these terms. These terms may be used to distinguish one element from another. For example, a first element may be termed a second element and a second element may be termed a first element without departing from the scope of the present invention. As used herein, the term "and/or" may include any and all combinations of one or more of the associated listed items.

Relative terms such as "below," "above," "upper,", "lower," "horizontal" or "vertical" may be used herein to describe a relationship of one element, layer, or region to another element, layer, or region as illustrated in the figures. It will be understood that these terms are intended to encompass different orientations of the device in addition to the orientation depicted in the figures.

Figure 1:
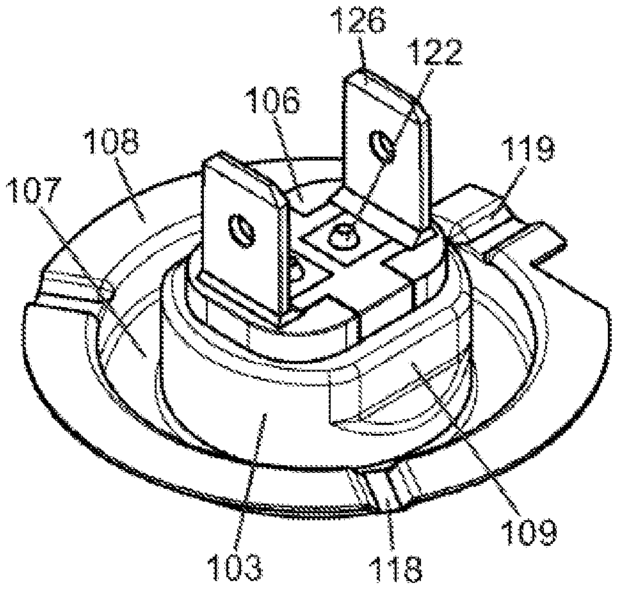
prior art FIG. 1
FIG. 1 is a perspective view of a cap of a conventional halogen lamp.

FIG. 1 is a schematic perspective rear view of a cap of a conventional halogen lamp as used, for example, in H7 lamps for vehicle headlights. In the example illustrated in FIG. 1, and as described in U.S. Pat. No. 8,313,348, which is hereby incorporated by reference herein in its entirety, the halogen lamp includes a lateral wall arrangement 103, an electrical insulating interface 106, an upper side ring 107, an outer flange 108, a planar opposing walls 109, recesses 118, a key feature 119, electrical contacts 122, and a cone shaped aperture 126. The ring 107 may be a centering ring and may be used to mount a lamp in a lamp receptacle of a vehicle light, such as for the H7 vehicle headlight, in a manner aligned to the optical components of the headlight.

Figure 2:
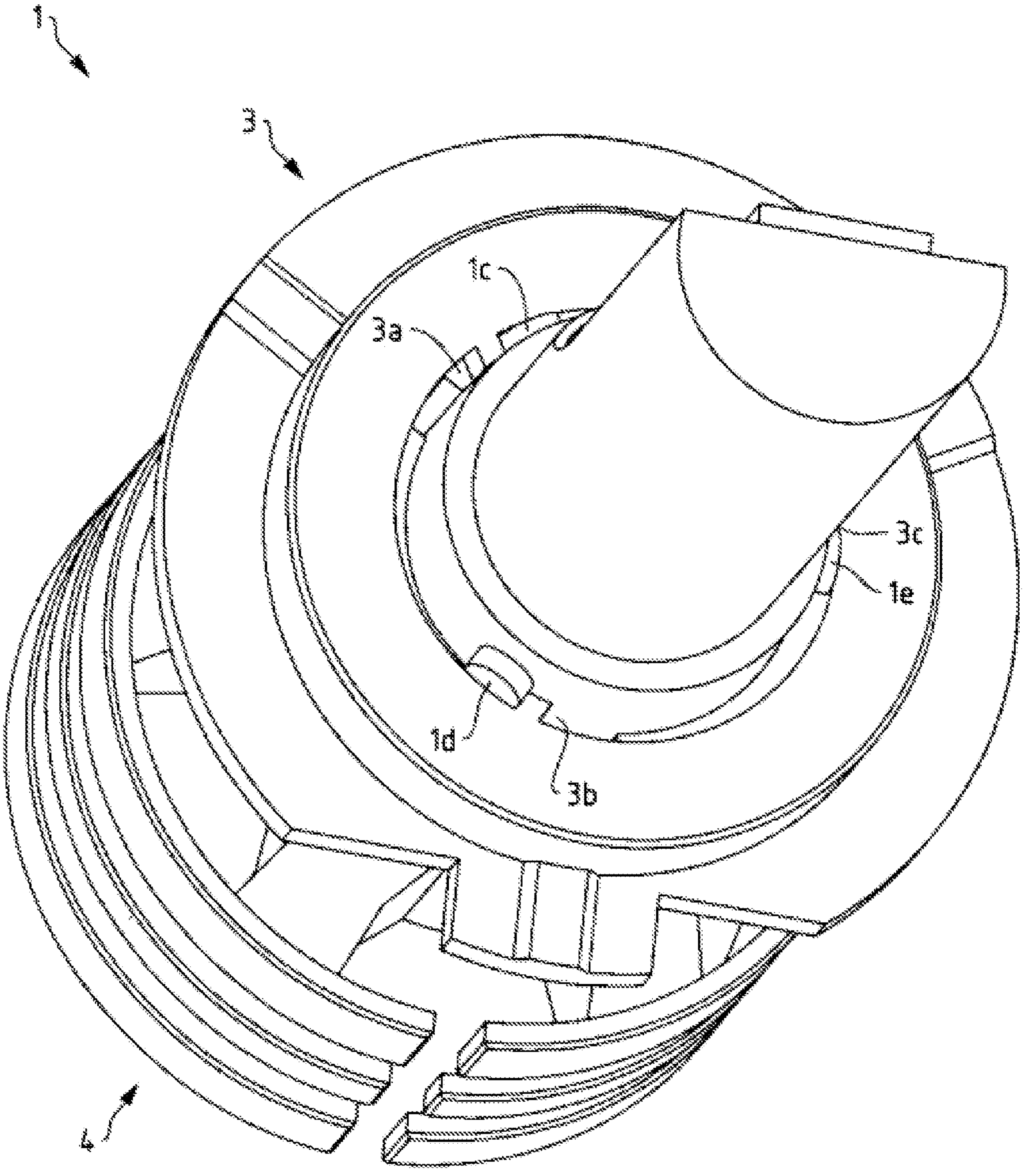
prior art FIG. 2
FIG. 2 is a perspective view of a conventional LED retrofit lamp.

FIG. 2 shows a schematic perspective view of a conventional LED retrofit lamp foreseen for replacing a conventional lamp, such as a halogen H7 lamp, the of which cap is shown in FIG. 1. In the example illustrated in FIG. 2, and as described in DE202020101383U1, which is hereby incorporated by reference herein in its entirety, the LED retrofit lamp includes an illumination body 1, fixation mechanisms 1*c*, 1*d*, le, adapter ring 3, recesses 3*a*, 3*b*, 3*c*, and a cooling body or heatsink 4. The adapter ring 3 may be a centering ring.

Figure 3:
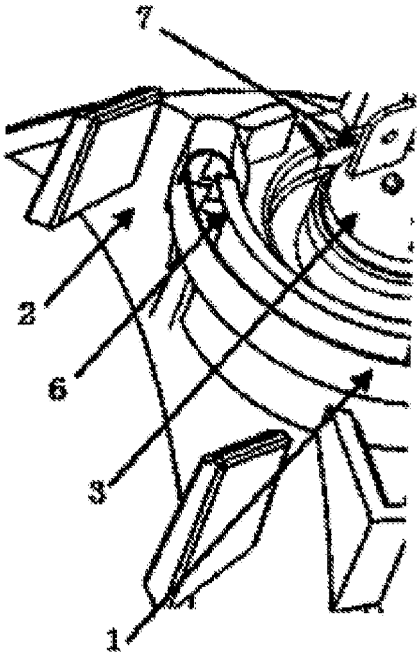
prior art FIG. 3
FIG. 3 are diagrams showing various views of a prior art clamping mechanism in a lamp receptacle.
Figure 3:
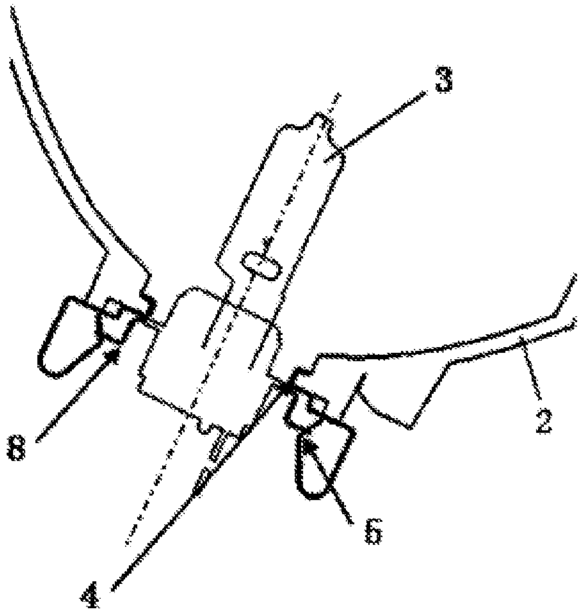
prior art FIG. 3
Figure 3:
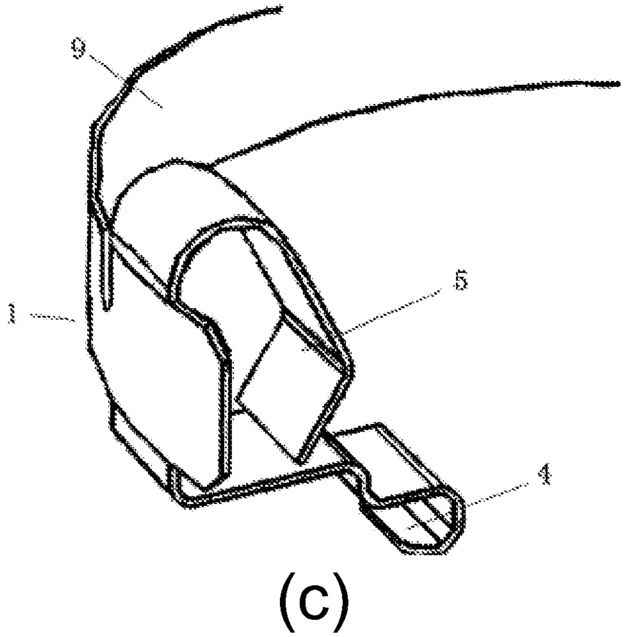
prior art FIG. 3

While the LED retrofit lamp shown in FIG. 2 may fit in many vehicle headlights, it may not be safely inserted in the lamp fixtures of some vehicles. Headlights that cause mounting problems may use springs clamping the centering ring from the rear. Such an exemplary fixation system is shown in FIG. 3. In the example illustrated in FIG. 3, and as described in CN201228895Y, which is hereby incorporated by reference herein in its entirety, the fixation system includes a mounting ring 1, a reflector 2, an H7 bulb 3, a hook shaped clip 4, a snap ring 5, a headlight socket 6, a bulb pin 7, a flange shaped mounting piece 8, and a metal ring 9. The flange shaped mounting piece 8 may be a centering ring, and the mounting ring 1 has a snap ring 5 that may form the spring clamping, which may clamp the centering ring 8 from its rear side (see FIG. 3(*b*)).

The centering rings of conventional H7 halogen lamps are much thinner than the centering rings of the LED retrofits that present fixation problems. Such thickness difference may be due to the fact that the centering rings of conventional H7 halogen lamps are made of metal while the centering rings of the respective LED retrofits are made of plastic. Plastic, and in particular low cost plastic, however, is a much less stable material than metal, requiring a larger thickness of the plastic rings compared to the metal rings to provide the same component stability.

Instead of replacing the plastic with metal or investigating for high stability plastics, with both measures increasing cost, a solution using common plastic rings to achieve both a safe fixation and a spring clamping fixation mechanism, without compromising the overall stability of the centering rings, may be desirable. It may be sufficient for safe clamping to thin the centering ring only at the positions of the clamping springs and only so far inwards from the centering ring's outer rim as the clamping springs need to engage the centering ring's flange for safe fixation. For achieving such thinning, an outer rim of the centering ring may be provided with a recess in at least two locations of the outer rim. The centering ring may have, in the recess, a smaller thickness than in the adjacent parts of the centering ring.

Restricting thinning of the centering ring to the recess in the outer rim may maintain the centering ring's mechanical stability, such being mainly determined by the thickness of the centering ring in the non-peripheral parts of the centering ring. The degree of thinning in the recess may depend on the dimensions of the specific clamping spring mechanism of the lamp fixture the LED retrofit lamp should be inserted into. A thinning of at least 30% may work with most clamping springs fixation mechanisms encountered in the installation base of conventional vehicle lamps.

With a clamping springs fixation mechanism encompassing at least two clamping springs, the thinning may need to be performed at least at two locations of the outer rim of the centering ring, corresponding, in clamped position, to the clamping springs' positions. It may be desirable to thin the outer rim of the centering ring at more than two locations, such as three locations, which may correspond to three clamping springs, which may provide an improved fixation stability by excluding a rotational movement around the connecting axis of just two fixation clamps.

Figure 4:
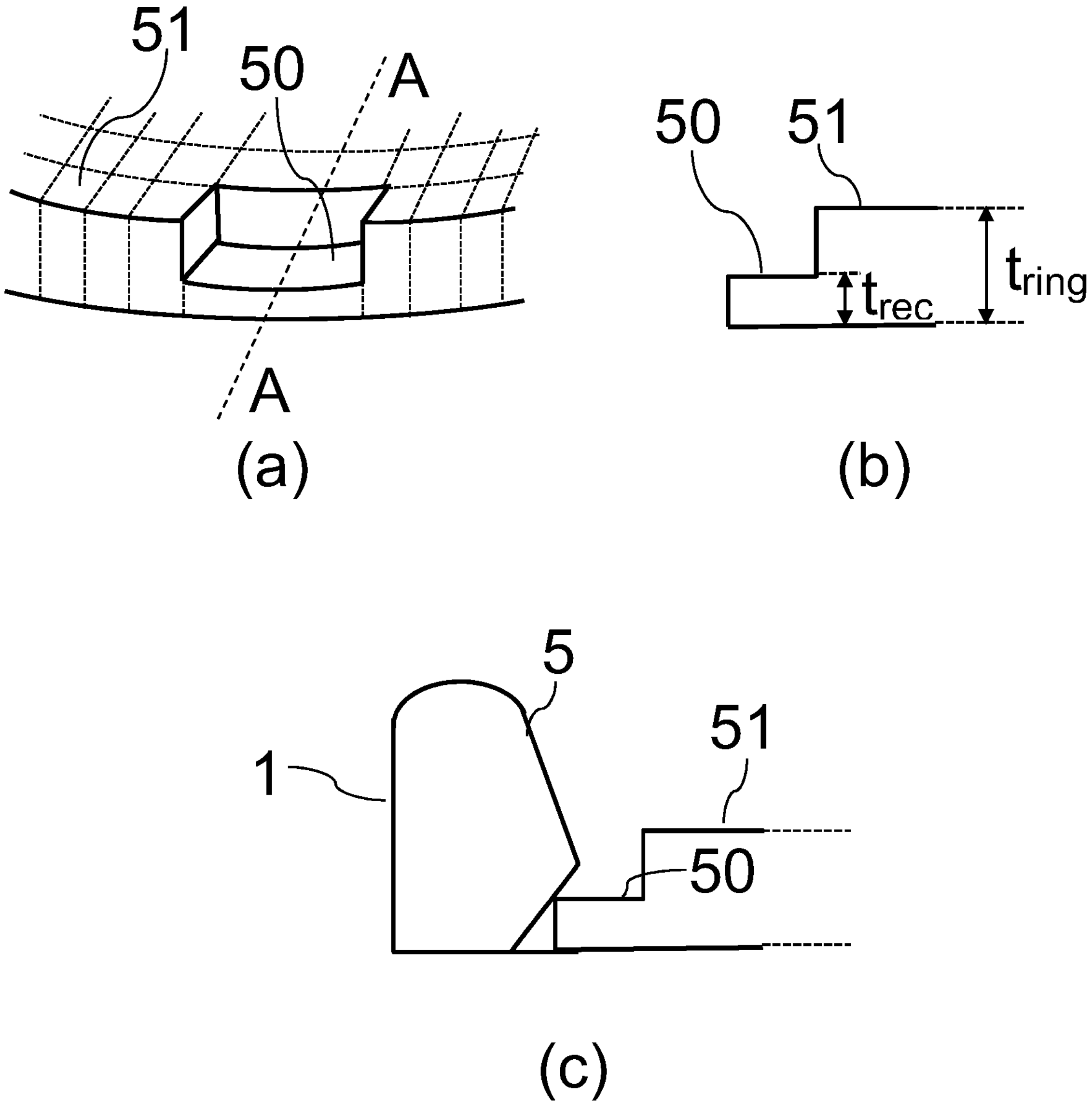
FIG. 4 are diagrams showing various views of an example centering ring and its fixation by a clamping spring.

FIG. 4(*a*) shows a perspective view of a detail of an example centering ring with its outer rim 51 having a recess 50. The recess 50 may be positioned at a location corresponding to a clamping spring position when the LED retrofit is inserted into a lamp fixture. FIG. 4(*b*) shows the section of FIG. 4(*a*) taken along line A—A, illustrating that the thickness of the centering ring within the recess 50 is, in the illustrated embodiment, more than 30% less than the thickness $t_{ring}$ of the centering ring in its parts neighboring the recess 50. FIG. 4(*c*) shows, in sectional view, how a snap ring 5 of a centering ring 1 as shown in FIG. 3(*c*), on fixation, may engage the centering ring within its recess 50. Please, note that, for better visibility, FIGS. 3(*c*), 4, and 5 show the clamping springs and centering rings in a flipped-around position (upside-down) as compared to the other figures.

The stability of a centering ring may mainly be determined by its thickness in its non-peripheral part, thus, depending on the intrinsic stability of the centering ring's material, such thickness in its non-peripheral part may need to achieve a minimum value. In its outer rim part, the centering ring may be thinner without unacceptably endangering its stability. In a further embodiment, the thinning may not be restricted to single separated locations but may extend to larger parts of the outer rim. Thus, instead of thinning the rim in two isolated locations, the complete outer rim, or at least the parts of the outer rim outside of the keying features of the centering ring (e.g., recesses 118 and key feature 119 in FIG. 1) may be thinned, in a homogenous, or in an inhomogeneous manner.

In some embodiments, instead of being localized, the recess 50 may extend with the same thickness $t_{rec}$ along the rim. Alternatively, the thickness $t_{rec}$ may vary along the rim. Further, besides the rectangular sectional profile of recess 50 as shown in FIG. 4(*b*), this disclosure may encompass any other profile as long as the recess thickness and profile at the location where, on insertion into a lamp fixture, the clamping springs engage with the recess provide a safe fixation of the LED retrofit within the lamp fixture. As with the thickness, also the shape of the recess along the rim may stay the same or may vary.

Figure 5:
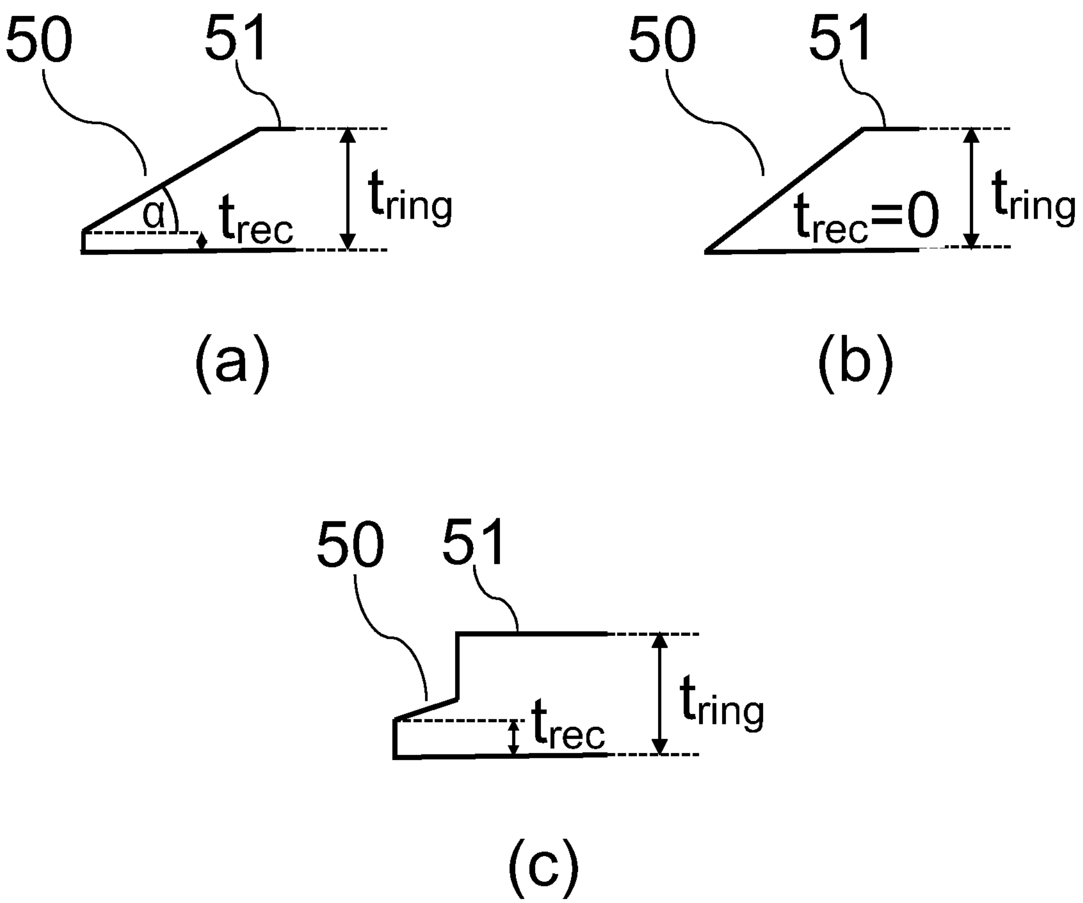
FIG. 5 are sectional views of recess profiles in an outer rim of a disclosed centering ring.

FIG. 5 shows, in sectional views, some examples of alternative recess profiles to the rectangular profile of FIG. 4(*b*). Of those, the triangular profile of FIG. 5(*b*) might provide best fixation properties (with correspondingly bended clamping springs). The chamfered edge profiles of FIGS. 5(*a*) and (*b*) may be especially easy to manufacture by afterwards machining, e.g. by a grinding tool, of a firstly constant-thickness manufactured centering ring. On the other hand, by using appropriately formed molds, the various profiles as well as isolated locations of the recess may be manufactured without additional effort on molding the centering ring.

With the chamfered edge profiles of FIGS. 5(*a*) and (*b*), choosing, in particular, a chamfering angle $\alpha$, enclosed between an inclined face of the chamfered edge with a surface plane of the centering ring, of 45° may allow an especially easy insertion of the LED retrofit lamp into the lamp receptacle as the clamp springs, on insertion, will be guided inwards by the inclined face of the chamfered rim.

Extending the recess in a homogenous manner along the rim of the centering ring may yield considerable advantages for mass production as the homogeneity of the outer rim recessing renders the centering ring independent from the particular position of the clamping springs in the various lamp fixtures. The clamping spring positions are not standardized in the industry, thus, may vary from one headlight type to another. Using the same recessed rim profile along its circumference may allow the same centering ring to be used for all these different lamp fixtures, thus, yielding economy of scale in production.

Figure 6:
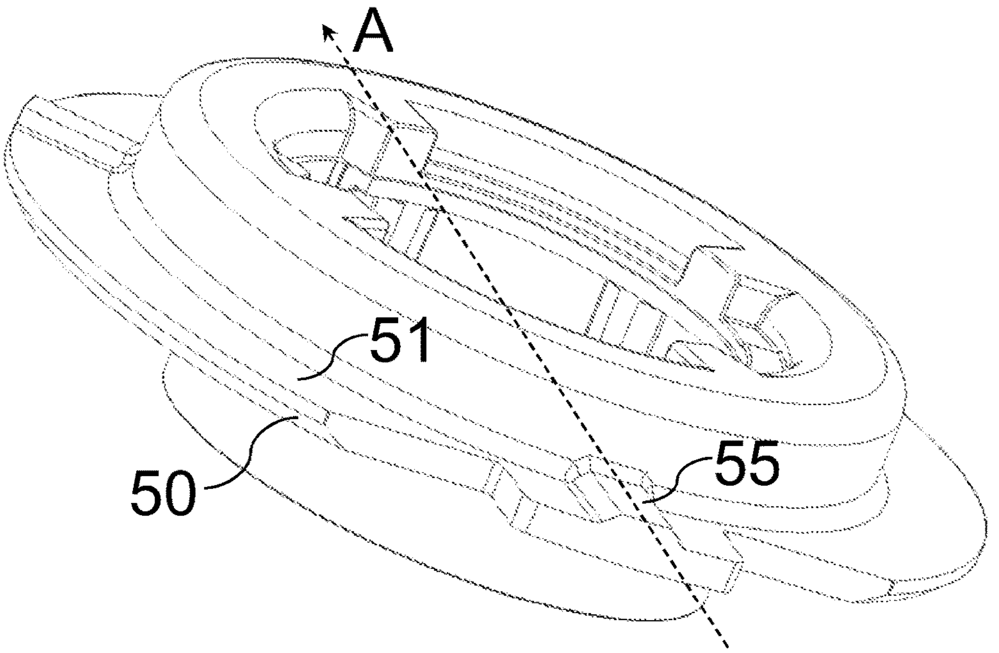
FIG. 6 shows a perspective and front views of an embodiment of a centering ring.
Figure 6:
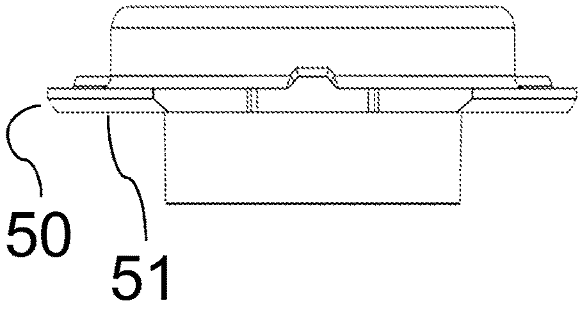
Figure 6:
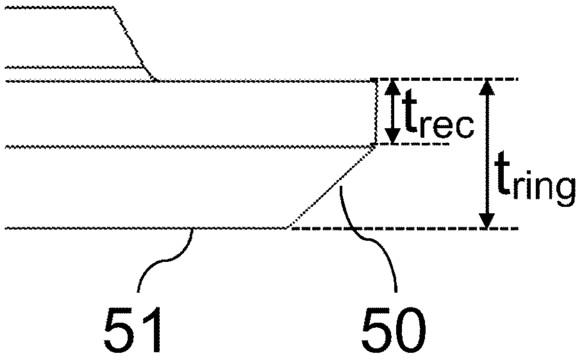

FIG. 6 shows an embodiment of another example centering ring with a chamfered edge profile, in (a) seen in perspective view, in (b) in front view (seen along direction A as indicated in (a)), and in (c) a detail of (b). The chamfering may extend in a homogenous manner along the circumference of the outer rim, only excluding the front side of the centering ring carrying the main keying feature 55 (termed key feature 119 in FIG. 1) where some lamp fixtures foresee no clamping springs. Providing no chamfering at the main keying feature 55 may be advantageous for manufacturing the chamfering after molding of the centering ring, e.g. by grinding, as the other parts of the centering ring are rotationally symmetric allowing a fixed position grinding tool along which the centering ring is rotated. However, if so required by specific lamp fixtures, the chamfering might also be manufactured along the complete circumference of the outer rim 51, including the main keying feature 55. This can be done e.g. by using an appropriate mold shape or, if chamfering is done after molding, by using a more flexible grinding process.

The centering ring may be mounted to a lamp body of an LED retrofit lamp. Such LED retrofit lamp may be similar to the LED retrofit lamp shown in FIG. 2, but with the centering ring described herein with a recess at least two locations of its outer rim instead of the centering rings without any recess at their outer rims. Such lamp may be a part of a vehicle headlight, which may also include a lamp fixture with a clamping mechanism, such as illustrated in FIG. 3 and described above, to hold the LED retrofit lamp by clamping the LED retrofit lamp's centering ring in its recess at least two locations of its outer rim.

Figure 7:
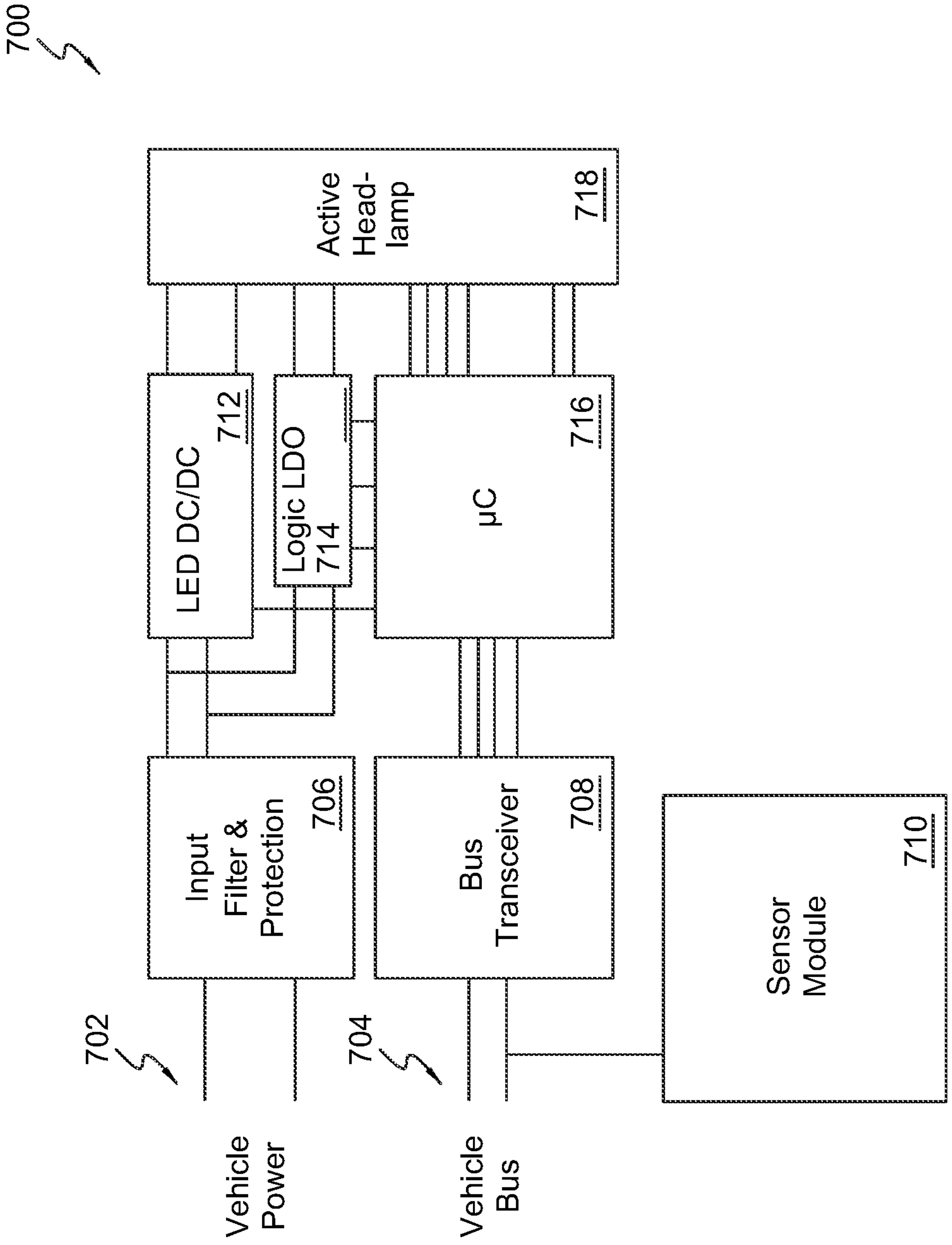
FIG. 7 is a diagram of an example vehicle headlamp system that may incorporate one or more of the embodiments and examples described herein.

FIG. 7 is a diagram of an example vehicle headlamp system 700 that may incorporate one or more of the embodiments and examples described herein. The example vehicle headlamp system 700 illustrated in FIG. 7 includes power lines 702, a data bus 704, an input filter and protection module 706, a bus transceiver 708, a sensor module 710, an LED direct current to direct current (DC/DC) module 712, a logic low-dropout (LDO) module 714, a micro-controller 716 and an active head lamp 718.

The power lines 702 may have inputs that receive power from a vehicle, and the data bus 704 may have inputs/outputs over which data may be exchanged between the vehicle and the vehicle headlamp system 700. For example, the vehicle headlamp system 700 may receive instructions from other locations in the vehicle, such as instructions to turn on turn signaling or turn on headlamps, and may send feedback to other locations in the vehicle if desired. The sensor module 710 may be communicatively coupled to the data bus 704 and may provide additional data to the vehicle headlamp system 700 or other locations in the vehicle related to, for example, environmental conditions (e.g., time of day, rain, fog, or ambient light levels), vehicle state (e.g., parked, in-motion, speed of motion, or direction of motion), and presence/position of other objects (e.g., vehicles or pedestrians). A headlamp controller that is separate from any vehicle controller communicatively coupled to the vehicle data bus may also be included in the vehicle headlamp system 700. In FIG. 7, the headlamp controller may be a micro-controller, such as micro-controller (pc) 716. The micro-controller 716 may be communicatively coupled to the data bus 704.

The input filter and protection module 706 may be electrically coupled to the power lines 702 and may, for example, support various filters to reduce conducted emissions and provide power immunity. Additionally, the input filter and protection module 706 may provide electrostatic discharge (ESD) protection, load-dump protection, alternator field decay protection, and/or reverse polarity protection.

The LED DC/DC module 712 may be coupled between the input filter and protection module 106 and the active headlamp 718 to receive filtered power and provide a drive current to power LEDs in the LED array in the active headlamp 718. The LED DC/DC module 712 may have an input voltage between 7 and 18 volts with a nominal voltage of approximately 13.2 volts and an output voltage that may be slightly higher (e.g., 0.3 volts) than a maximum voltage for the LED array (e.g., as determined by factor or local calibration and operating condition adjustments due to load, temperature or other factors).

The logic LDO module 714 may be coupled to the input filter and protection module 706 to receive the filtered power. The logic LDO module 714 may also be coupled to the micro-controller 716 and the active headlamp 718 to provide power to the micro-controller 716 and/or electronics in the active headlamp 718, such as CMOS logic.

The bus transceiver 708 may have, for example, a universal asynchronous receiver transmitter (UART) or serial peripheral interface (SPI) interface and may be coupled to the micro-controller 716. The micro-controller 716 may translate vehicle input based on, or including, data from the sensor module 710. The translated vehicle input may include a video signal that is transferrable to an image buffer in the active headlamp 718. In addition, the micro-controller 716 may load default image frames and test for open/short pixels during startup. In embodiments, an SPI interface may load an image buffer in CMOS. Image frames may be full frame, differential or partial frames. Other features of micro-controller 716 may include control interface monitoring of CMOS status, including die temperature, as well as logic LDO output. In embodiments, LED DC/DC output may be dynamically controlled to minimize headroom. In addition to providing image frame data, other headlamp functions, such as complementary use in conjunction with side marker or turn signal lights, and/or activation of daytime running lights, may also be controlled.

Figure 8:
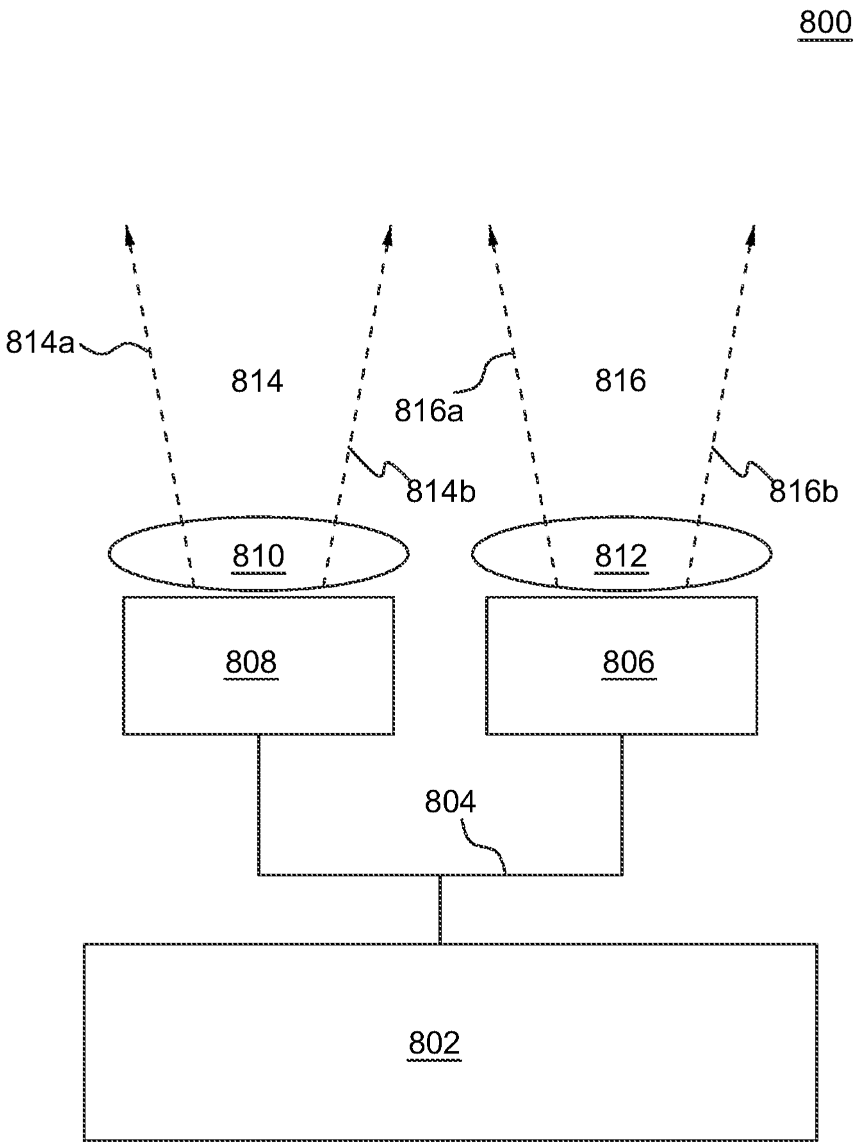
FIG. 8 is a diagram of another example vehicle headlamp system.

FIG. 8 is a diagram of another example vehicle headlamp system 800. The example vehicle headlamp system 800 illustrated in FIG. 8 includes an application platform 802, two LED lighting systems 806 and 808, and secondary optics 810 and 812.

The LED lighting system 808 may emit light beams 814 (shown between arrows 814*a* and 814*b* in FIG. 8). The LED lighting system 806 may emit light beams 816 (shown between arrows 816*a* and 816*b* in FIG. 8). In the embodiment shown in FIG. 8, a secondary optic 810 is adjacent the LED lighting system 808, and the light emitted from the LED lighting system 808 passes through the secondary optic 810. Similarly, a secondary optic 812 is adjacent the LED lighting system 806, and the light emitted from the LED lighting system 806 passes through the secondary optic 812. In alternative embodiments, no secondary optics 810/812 are provided in the vehicle headlamp system.

Where included, the secondary optics 810/812 may be or include one or more light guides. The one or more light guides may be edge lit or may have an interior opening that defines an interior edge of the light guide. LED lighting systems 808 and 806 may be inserted in the interior openings of the one or more light guides such that they inject light into the interior edge (interior opening light guide) or exterior edge (edge lit light guide) of the one or more light guides. In embodiments, the one or more light guides may shape the light emitted by the LED lighting systems 808 and 806 in a desired manner, such as, for example, with a gradient, a chamfered distribution, a narrow distribution, a wide distribution, or an angular distribution.

The application platform 802 may provide power and/or data to the LED lighting systems 806 and/or 808 via lines 804, which may include one or more or a portion of the power lines 702 and the data bus 704 of FIG. 7. One or more sensors (which may be the sensors in the vehicle headlamp system 800 or other additional sensors) may be internal or external to the housing of the application platform 802.

Alternatively, or in addition, as shown in the example vehicle headlamp system 700 of FIG. 7, each LED lighting system 808 and 806 may include its own sensor module, connectivity and control module, power module, and/or LED array.

In embodiments, the vehicle headlamp system 800 may represent an automobile with steerable light beams where LEDs may be selectively activated to provide steerable light. For example, an array of LEDs or emitters may be used to define or project a shape or pattern or illuminate only selected sections of a roadway. In an example embodiment, infrared cameras or detector pixels within LED lighting systems 806 and 808 may be sensors (e.g., similar to sensors in the sensor module 710 of FIG. 7) that identify portions of a scene (e.g., roadway or pedestrian crossing) that require illumination.

Having described the embodiments in detail, those skilled in the art will appreciate that, given the present description, modifications may be made to the embodiments described herein without departing from the spirit of the disclosure. Therefore, it is not intended that the scope of the disclosure be limited to the specific embodiments illustrated and described.

What is claimed is:

1. A centering ring for an LED retrofit lamp, the centering ring comprising:
- a ring-shaped body comprising an outer ring and an opening in a central region of the ring-shaped body configured to receive the LED retrofit lamp, the outer ring having a first thickness; and
- a recess formed in the outer ring of the ring-shaped body in at least two locations, wherein the recess has a second thickness at least 30% less than the first thickness.

2. The centering ring according to claim 1, further comprising an additional recess formed in the outer ring of the ring-shaped body in a third location.

3. The centering ring according to claim 1, wherein a shape of a sectional profile of the recess is one of a rectangle, a chamfered edge, or an indentation.

4. The centering ring according to claim 1, wherein the outer ring further comprises keying features in regions of the outer ring, and wherein the recess extends along the outer ring of the centering ring except for the regions carrying the keying features.

5. The centering ring according to claim 4, wherein a shape of a sectional profile of the recess has the same shape along the outer ring.

6. The centering ring according to claim 5, wherein the shape of the sectional profile of the recess is a chamfered edge.

7. The centering ring according to claim 6, wherein a chamfering angle enclosed by an inclined face of the chamfered edge with a surface plane of the centering ring is 45°.

8. An LED retrofit lamp comprising:
- a lamp body; and
- a centering ring mounted to the lamp body, the centering ring comprising:
  - a ring-shaped body comprising an outer ring and an opening in a central region of the ring-shaped body configured to receive the LED retrofit lamp, the outer ring having a first thickness, and
  - a recess formed in the outer ring of the ring-shaped body in at least two locations, wherein the recess has a second thickness at least 30% less than the first thickness.

9. The lamp of claim 8, further comprising an additional recess formed in the outer ring of the ring-shaped body in a third location.

10. A vehicle headlight comprising:
- an LED retrofit lamp comprising:
- a lamp body, and
- a centering ring mounted to the lamp body, the centering ring comprising:
  - a ring-shaped body comprising an outer ring and an opening in a central region of the ring-shaped body configured to receive the LED retrofit lamp the outer ring having a first thickness, and
  - a recess formed in the outer ring of the ring-shaped body in at least two locations, wherein the recess has a second thickness at least 30% less than the first thickness; and
  - a lamp fixture comprising a clamping spring fixation mechanism that holds the LED retrofit lamp.

11. The headlight of claim 10, further comprising an additional recess formed in the outer ring of the ring-shaped body in a third location.

* * * * *